INVENTOR.
CLARENCE P. OUELLETTE

Aug. 23, 1966  C. P. OUELLETTE  3,267,566
BOTTLE COLLAR APPLYING MECHANISM
Filed Nov. 29, 1962  6 Sheets-Sheet 4
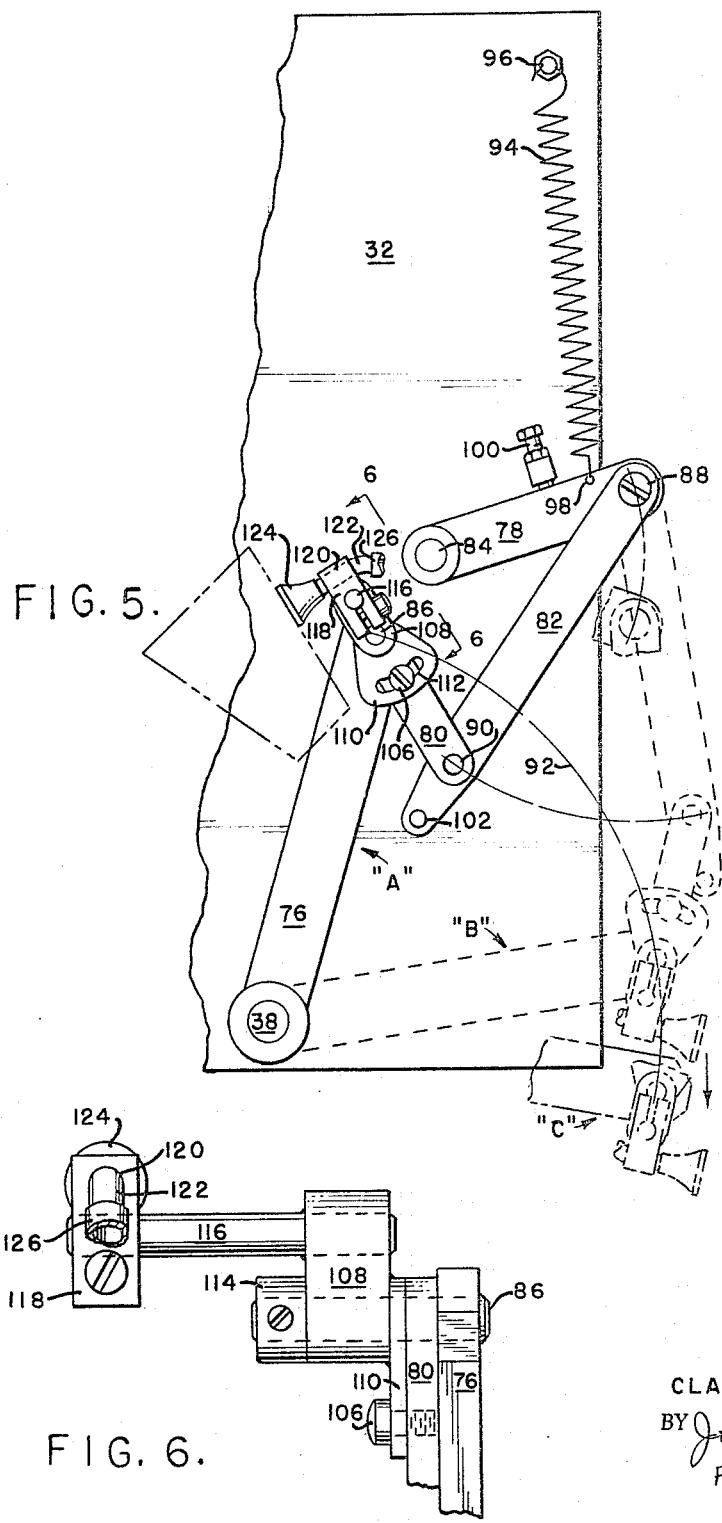
INVENTOR.
CLARENCE P. OUELLETTE
BY John J. Stevens
Patent Agent INVENTOR.
CLARENCE P. OUELLETTE
BY John F. Stevens
Patent Agent Aug. 23, 1966  C. P. OUELLETTE  3,267,566
BOTTLE COLLAR APPLYING MECHANISM
Filed Nov. 29, 1962  6 Sheets-Sheet 6

INVENTOR.
CLARENCE P. OUELLETTE
BY John F. Stevens
Patent Agent

United States Patent Office 3,267,566
Patented August 23, 1966

3,267,566
BOTTLE COLLAR APPLYING MECHANISM
Clarence P. Ouellette, East Longmeadow, Mass., assignor to United States Envelope Company, Springfield, Mass., a corporation of Maine
Filed Nov. 29, 1962, Ser. No. 240,865
2 Claims. (Cl. 29—208)

This invention relates generally to a machine for automatically applying collars of generally truncated conical shape to the neck portion of bottles moving successively along a conveyor. More specifically, this invention relates to a machine for withdrawing collars, one at a time, from a nest held in a magazine with the larger rim up, inverting the collars, and applying them to selected bottles moving in a line below the magazine.

The invention has particular application in the fields of bottled beverages, foods, dairy products, household products, etc., where containers having the usual relatively large body portion and relatively small opening at the top, connected by a neck portion tapering outwardly from the top to the body portion, are used. Collars of paper or other flexible material having advertising or decorative matter carried thereon which conform generally to the neck portion of such bottles have seen rather prominent acceptance in these bottling fields. The fact that manual labor has been used extensively for application of the collars to the bottles has made the cost of their application excessive.

Such a machine must possess a number of qualities. The most logical place for bottle collaring machine to be placed is on the conveyor moving bottles from their filling and capping location to their casing location. In this position, it is imperative that the collaring machine be able to handle bottles as fast as they are moved along the conveyor, and not restrict this flow of bottles. Production cannot be adjusted to the capabilities of the collaring machine; the collaring machine must be designed to fit into the existing environment.

It is also necessary that the collaring machine does not depend upon the speed of the conveyor or the spacing of the bottles thereon. Conditions on the conveyor vary considerably from time to time. The bottles are randomly spaced, and the speed of the bottles moving past the collaring machine varies, because it is not unusual for the bottles to back up on the conveyor as trouble sometimes develops at the casing station, resulting in a variation in bottle speed from a standstill to conveyor speed. It has also been found that the conveyor is frequently wider than the diameter of the bottles being conveyed. This condition results in considerable variation in the lateral position of successive bottles. In this respect, the present invention provides a collaring machine which will handle the bottles as fast as they are moved down the conveyor, but which does not depend upon the conveyor to place the bottles in collaring position at the machine.

It is also necessary that such a collaring machine be able to withdraw collars individually from a nest of the collars, and place them over the necks of bottles as the bottles are successively moved into collaring position. This invention also provides a machine which will support a nest of collars above the bottle conveyor, the nest being disposed such that the small ends of the collars in the nest are leading when the collars are withdrawn individually therefrom, allowing the collars to be gripped from their outer surface, and which will transfer the so withdrawn collar to a position over the neck of a bottle in collaring position.

The present invention also provides a machine which will actually carry the collar over the neck of the bottle to be collared to a position where the small end of the collar is well past the top of the bottle, which commonly has a ring of larger diameter than the neck thereof, and tends to restrict passage of a collar therepast. Once the collar has been carried past the top of the bottle, the machine according to this invention gives the collar sufficient thrust in a direction axially of the bottle to seat the collar on the tapering shoulder portion of the bottle. This is one of the most important features of this invention. In the past, the small end of the collar has been designed large enough so that it will easily fall over the top of the bottle to be collared. This presents a problem when the bottles are shipped in open vehicles because the wind tends to lift the collars right off the bottles. By collaring the bottles with a machine according to this invention, the small end of the collar may be designed to be of a size very nearly the size of the largest portion of the top of the bottle, because the collar is positively applied to the bottle, and does not depend on gravity to pull it over.

Another important advantage is realized by the method of approach and application of the collar to the bottle. In speeds such as those required to move the collar from the nest to the neck of the bottle in the time provided, windage effects during the swift movement of the collar from the nest to the top of the bottle become prominent. It is advantageous for the machine to axially move the collar in a line toward its destination with its larger rim turned downwardly for an appreciable distance prior to reaching the top of the bottle to hold it open to its fullest extent. At relatively slow operating speeds, or with collars of relatively heavy weight material, this point is relatively immaterial, but becomes more critical when the speed of operation is relatively great or a relatively lightweight collar material is used.

For the purpose of description, the bottle collaring machine according to this invention may be broken down into two synchronized systems—a bottle transfer mechanism, and a collar transfer system. As this language implies, the bottle transfer mechanism comprises a means for positively transferring bottles into the machine, momentarily halting them in a collaring station, and then allowing the bottles to proceed along the conveyor. The collar transfer mechanism comprises a means for withdrawing collars individually from a nest of the collars, inverting the collar to a "large rim down" position, and then applying the collar to a bottle in the collaring station.

The invention will now be described in further detail with reference to the drawings, in which:

FIGURE 4 is a partial plan view taken along line 4—4 of FIGURE 3;

FIGURE 5 is an enlarged partial elevation view, showing the collar transfer mechanism in detail;

FIGURE 6 is a view taken along line 6—6 of FIGURE 5;

Figure 1:
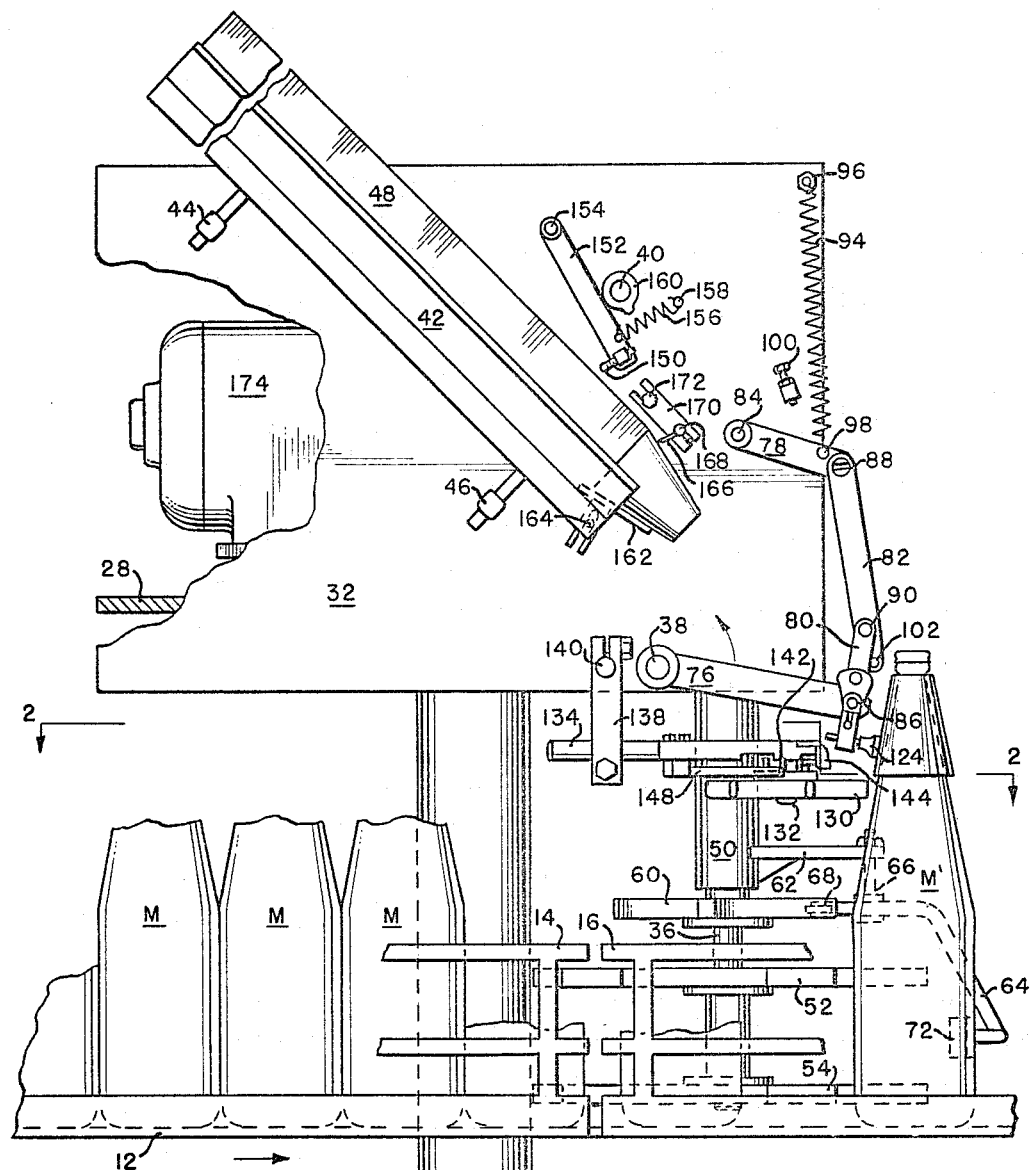
FIGURE 1 is an elevation view of the machine positioned adjacent a bottle conveyor running from left to right as shown, the collar transfer mechanism being shown near the end of its collar transfer stroke where the collar is released over the neck of the bottle in the collaring station, shown at the far right.

Referring to the drawings, the bottle collaring machine 5 is designed to be placed adjacent a bottle conveyor 12, on which the bottles progress from one station in a bottling plant to a succeeding station. Normally, the bottle collaring machine would be placed just upstream from the "casing" staation. It is very easy to operate a machine according to this invention on a production line, and it can be tied into the bottle conveyor by simply removing short sections of the side rails 14 of the conveyor 12. On the side of the conveyor 12 opposite the machine side, the normally straight rails are replaced by the curved rails 16, the ends of which lie closely adjacent the ends of the side rails 14 so as to form guides for the bottles as they are transferred through the machine.

The machine is supported in its position adjacent the conveyor 12 by telescoping upright members 18 and 20, lower member 20 being fixed to a base plate 22. A hand wheel and jack (not shown) may be provided for easily adjusting the level of the machine and screws 24 and 26 may then be tightened at the desired level to hold the machine in position.

Horizontal frame plate 28 is rigidly mounted to a flange at the top of section 18 and provides support for the components of the machine assembly. Upright frame plates 32 and 34 are rigidly mounted to the horizontal frame plate 28. Operating shaft 36 extends through frame plate 28 and is journalled therein, providing drive means for the bottle transferring mechanism, which will be described hereinafter. Operating shafts 38 and 40 extend through frame plates 32 and 34 and are journalled therein, providing drive means for the collar transferring mechanism, and cam controls for other parts of the machine, which will also be described hereinafter. Collar magazine 42 is also mounted to frame plate 32 by support members 44 and 46, providing means to support the nested collars 48 in approximately the position shown in the drawings relative to the collar transferring mechanism.

Figure 2:
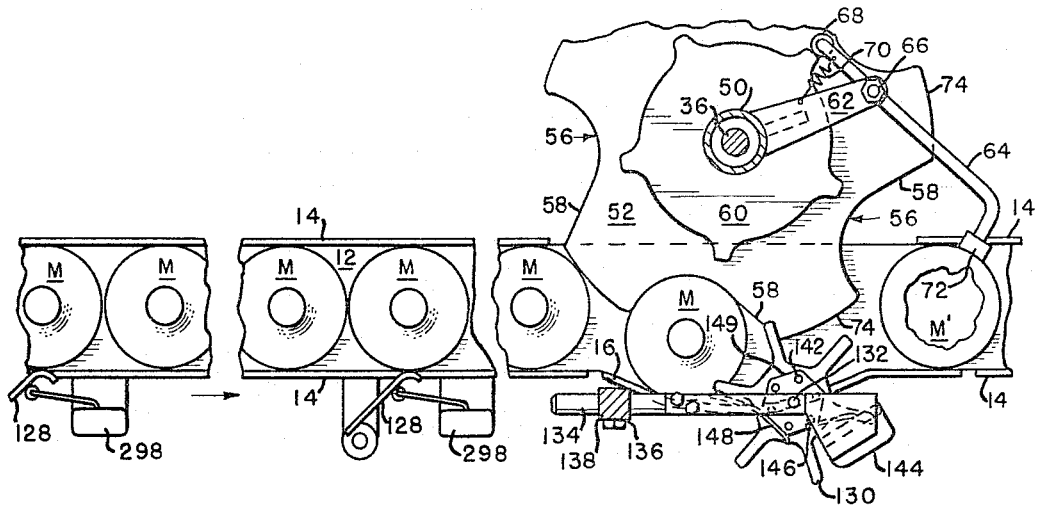
FIGURE 2 is a partial plan view taken along line 2—2 of FIGURE 1.

Shaft 36, extending through housing 50 as well as frame plate 28, is provided with generally circular, spaced bottle transferring wheels 52 and 54, which rotate with shaft 36 and are adjustable thereon. Wheels 52 and 54 are adapted to be positioned at particular heights to engage bottles and transfer them from a position just upstream from the machine, to a bottle collaring station, denoted by the position of bottle M, where the bottle is momentarily halted and a collar is placed over the neck thereof. Transfer wheels 52 and 54 have half-teardrop shaped slots 56 spaced at equal intervals around the periphery thereof, and are mounted on shaft 36 so that the slots 56 of wheel 52 register vertically with the slots 56 of wheel 54. The wheels 52 and 54 cooperate with curved side rails 16 to guide and transfer bottles M to the bottle collaring station. As best shown in FIGURES 2 and 4, the slots 56 include a tapered leading side 58 to aid in the correct positioning of a bottle M into slots 56 as the wheels 52 and 54 rotate. Conveyor 12 is constantly advancing from left to right, as shown in the drawings, and tending to urge the bottles M against the wheels 52 and 54, and, therefore, into the slots 56 as they come up.

Shaft 36 is also provided with a cam wheel 60 keyed thereto. Arm 62, fixed to housing 50, provides support for lever 64, pivoted thereon at 66. Cam follower 68 is urged against cam wheel 60 by spring 70. A stop member 72 of relatively soft material attached to the end of lever 64 is moved in and out of bottle stop position by cam 60, providing means for stopping bottles momentarily in the bottle collaring station.

The bottle collaring station, as referred to herein, is actually a position on the conveyor 12 immediately downstream from the bottle transfer wheels 52 and 54, where the bottle to be collared is momentarily halted and the collar is applied to the neck of the bottle. The position of a bottle in the collaring station is determined by the bottle stop member 72 and the outer rim 74 of the bottle transfer wheels 52 and 54. Bottles upstream from the collaring station will be hereinafter referred to as bottles M, and bottles in the collaring station will be hereinafter referred to as bottles M'. To insure that the centerlines of bottles of various sizes will be at the same location in the collaring station, the cam 60 may be of different configurations for different size bottles.

Figure 3:
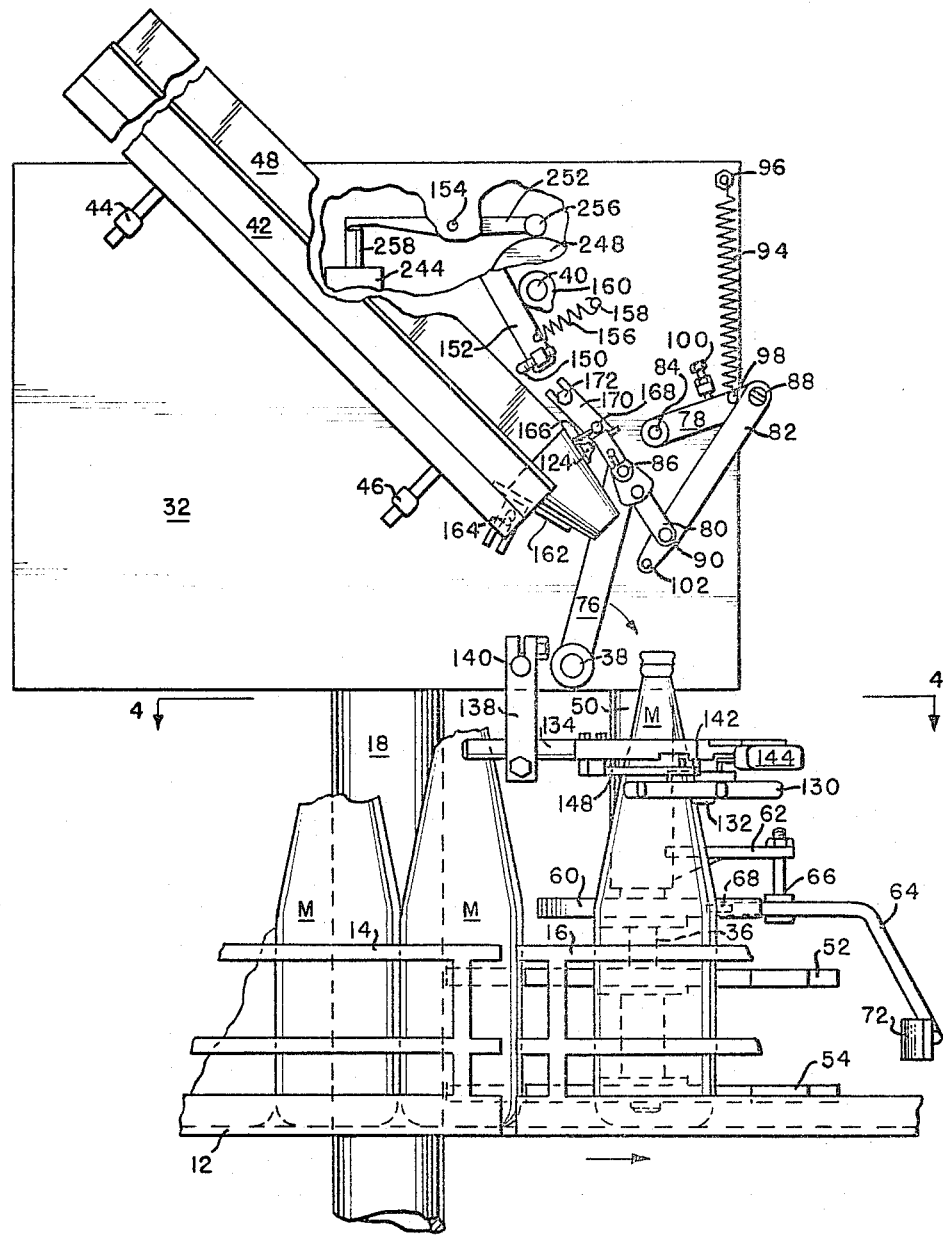
FIGURE 3 is an elevation view of the machine similar to FIGURE 1, showing the collar transfer mechanism in a position just prior to withdrawing the bottom collar from the nest and beginning its transfer stroke to collar the bottle, which is moving into the collaring station.

The collar transfer mechanism, which transfers collars from the nest 48 to the necks of bottles M' in the bottle collaring station, is best shown in FIGURES 5 and 6, but is shown in its relation to the rest of the machine in FIGURES 1 and 3. This mechanism includes a four-bar linkage having members 76, 78, 80, and 82, member 76 being fixed to operating shaft 38 which is provided with an angular rotation through a predetermined arc by means to be hereinafter described. Member 78 is pivotally mounted to frame plate 32 at 84. Member 80 is pivotally connected to member 76 at 86, and member 82 is pivotally mounted to member 78 at 88. Members 80 and 82 are pivotally connected at 90. The "stop" position of the mechanism is illustrated in FIGURE 5 in full lines, in which the linkage drive member 76 is resting in a position on its arc 92. Spring 94, anchored to frame plate 32 at 96, is attached to member 78 at 98, and tends to urge member 78 to rotate counterclockwise about 84 against stop pin 100 mounted to frame 32. Member 82 is provided with a portion extending beyond pivot point 90, and carries at the extended end a pin 102, which limits the rotation of member 80 relative to member 82, as shown by the dotted line position.

Member 80 is threaded to accept screw 106. Bar 108, pivoted on pin 86 has fixed at one side, plate 110 having slot 112, and is held on pin 86 by nut 114. Bar 108 can, therefore, be adjusted angularly on pin 86, relative to member 80 by loosening screw 106, making the adjustment, and then tightening the screw 106. Bar 108 carries fixed therein pin 116, which carries at its end an angularly adjustable suction head carrying element 118. Opening 120 in element 118 is adapted to accept a suction tube 122, at the end of which is carried a flexible suction cup 124, to which suction may be transmitted from tube 126 by a vacuum supply (not shown).

Upon rotation of shaft 38 an amount to rotate bar 76 from position A to position C, the members of the mechanism move relative to each other about their respective pivot points, and pass through position B shown in dotted lines in FIGURE 5.

The suction cup 124 upon correct adjustment to the size and taper of the collar held in the nest 48, and by operation of the linkage members 76, 78, 80, and 82 is caused to move in a line generally parallel to the axis of the nested collars 48 in its first phase of motion from position A. As soon as the bottom collar has been withdrawn, this axial movement is not critical, but the inversion of the collar to a "large rim down" position cannot begin until the collar has completely cleared the small ends of the end collar in nest 48. The inversion is accomplished prior to entering position B, and the last phase of movement of the collar is in a generally axial direction coinciding with the axis of a bottle M' in the collaring station. Movement during this phase continues until the suction cup 124 is lowered to a position such that the small end of the collar held thereby is well over the top of the bottle M'. The last phase of movement is the return stroke to position A.

An important part of the invention resides in the above manner of handling a collar from the beginning of withdrawal from the nest until it is placed over the neck of a bottle which has been momentarily stopped and positively held in the bottle collaring station. During the short time the bottle is held in the collaring station, the collar transferring mechanism transfers a collar in a substantially axial direction of the bottle, and positively places it well over the neck of the bottle. One of the most unique features about the machine is the mechanism for positively applying the collars well over the necks of the bottles at high speeds and releasing the collars before the collar transfer mechanism has come to the end of its stroke, so as to allow the momentum of the collar to seat the collar on the neck of a bottle M′. This does not depend on the collar to fall over the top of the bottle by gravity or momentum as in several previous machines of the prior art. Likewise, the small end of the collars may be very close to the size of the top of the bottle and the machine will operate successfuly.

It should be noted that when the wheels 52 and 54 are not rotating, the conveyor 12 slides beneath the bottles backed up from the machine, but when the wheels are rotated, the first 5 bottles backed will drop in consecutive slots 56, due to the action of the conveyor urging the bottles against the wheels 52 and 54. If there are not as many bottles backed up as there are slots 56, the bottle transfer mechanism, preferably, is not allowed to operate. Any suitable mechanism may be provided for controlling operation of the bottle transfer mechanism relative to the flow of bottles into the machine. It has been found that a satisfactory arrangement to handle this situation is to place a bottle detection apparatus on the conveyer upstream from the collaring machine. Accordingly, a system of bottle "feelers" 128 may be mounted on the conveyor side rail 14 upstream from the collaring machine, to indicate when a number of bottles have backed up to fit in each of the slots 56 of wheels 52 and 54. When the bottles are backed up past the feeler 128 most distant from the collaring machine, both of the feelers will be held depressed, closing a circuit to permit the bottle transfer wheels 52 and 54 to rotate for one complete revolution.

Positioned above the bottle transfer wheels 52 and 54 is a wheel 130 pivotally mounted at 132 on supporting member 134, which, in turn, is connected at 136 to arm 138. Arm 138 is connected to pin 140, which extends outwardly from frame plate 32. Wheel 130 has a number of radially extending arms spaced equidistantly around the hub thereof, and a corresponding number of pins 142, placed equidistantly around the hub. Switch 144 is mounted on supporting member 134, and has a switch lever 146 extending therefrom such as to be opened and closed by the action of a pin 142 passing thereby as the wheel 130 rotates. Switch 144 serves to open and close a circuit to a solenoid which, when energized, allows the collar transfer mechanism to operate.

As the bottles M are transferred to the collaring station, they contact an arm of wheel 130 and rotate the wheel 130 through an arc sufficient to move a pin 142 past the switch lever 146, consequently resulting in the operation of the collar transfer mechanism through a cycle. The wheel 130 is preferably adjustable longitudinally and laterally of the conveyor 12, as well as in a plane perpendicular to the conveyor 12, in order to accommodate different sizes of bottles. Also, the wheel 130 should be positioned a distance away from the bottle collaring station such that the timing of the bottle transferring mechanism and the collar transferring mechanism will be synchronized, i.e., the elapsed time between the bottle causing the switch 144 to close and the bottle being halted in the collaring station, should correspond to the time it takes for the collar transferring mechanism to withdraw a collar and begin to place it over the neck of bottle M′. Positive arcs of rotation of wheel 130 are maintained by spring 148 bearing against the flat, raised surfaces 149 of the hub of wheel 130. Spring 148 is mounted to supporting arm 134.

Any combination of the pins 142 may be screwed flush with the hub of wheel 130 so that switch lever 146 will not be tripped for a certain combination of bottles. In this manner, all the bottles moving through the machine, or certain combinations thereof, may be collared or certain combinations may be skipped.

To facilitate the removal of the bottom collar from the nest 48, and to eliminate doubles, a jogger 150 is provided to stroke the nest 48 each time the collar transfer mechanism is operated. Jogger 150 is attached to arm 152, which is pivotally mounted on frame plate 32 at 154. Arm 152 is urged to rotate in a counterclockwise direction by spring 156, connected to the frame plate 32 at 158. Arm 152 is operated by cam 160 fixed to shaft 40, which rotates once for every cycle of the collar transfer mechanism. The stroking of jogger 150 tends to gently provide for the snug fitting of the end collar of the nest 48 against the plate 162, which is adjustably attached to the magazine at 164, and the needle 166 held in pin 168. Pin 168 is attached to frame plate 32 by arm 170 at 172. The needle 166 is adjusted to lie against the end collar of the nest 48 at a point adjacent the large end thereof. As the end collar is withdrawn, the needle 166 tears through the edge of the collar and comes to rest against the succeeding collar in nest 48.

Figure 7:
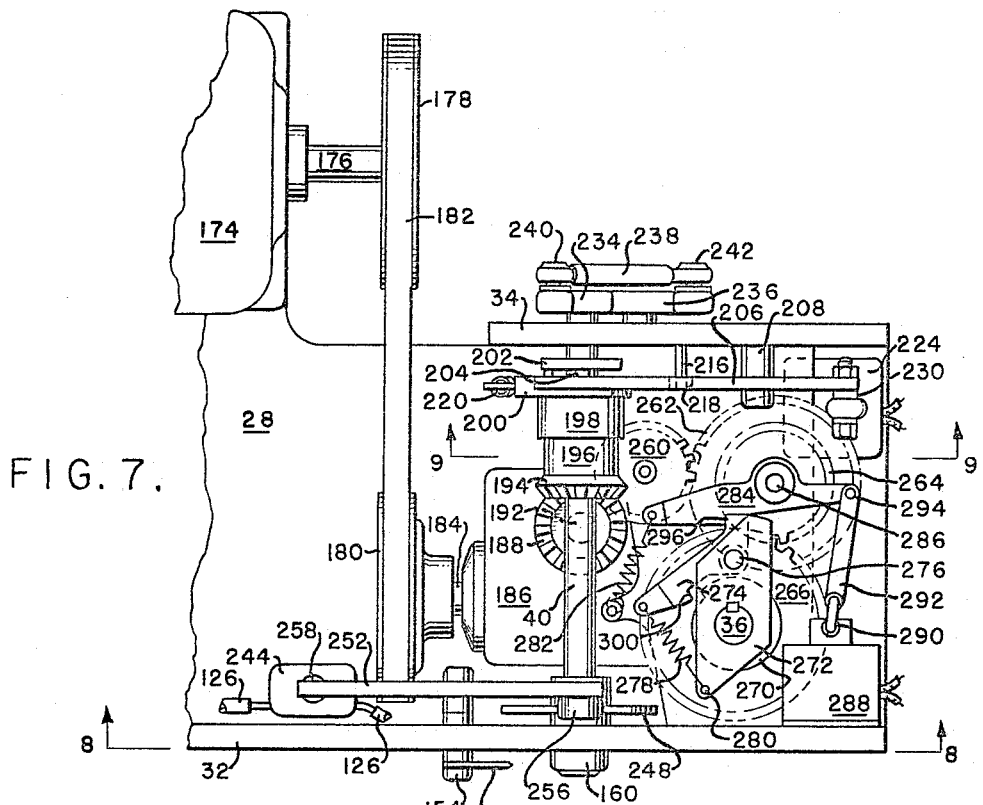
FIGURE 7 is a plan view of the drive means for imparting motion to the collar transfer mechanism, bottle transfer mechanism, and other secondary driven parts of the machine.
Figure 8:
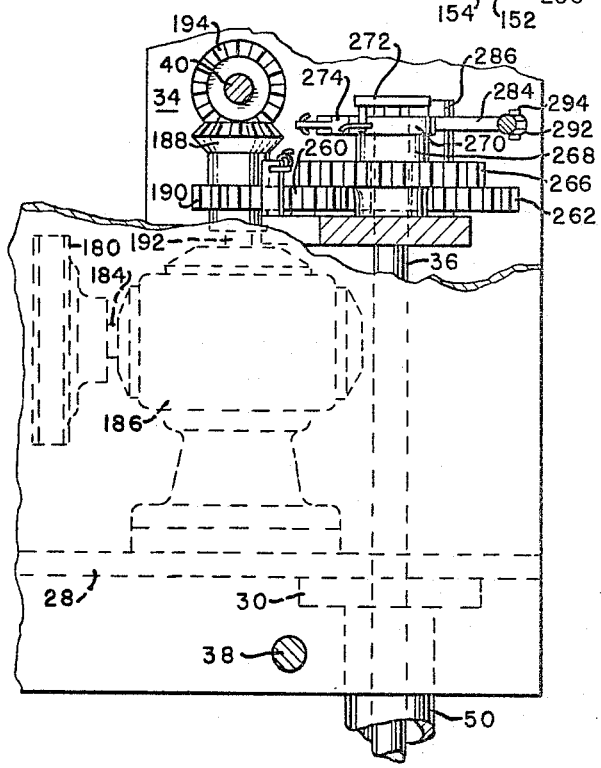
FIGURE 8 is a section view taken along line 8—8 of FIGURE 7.
Figure 9:
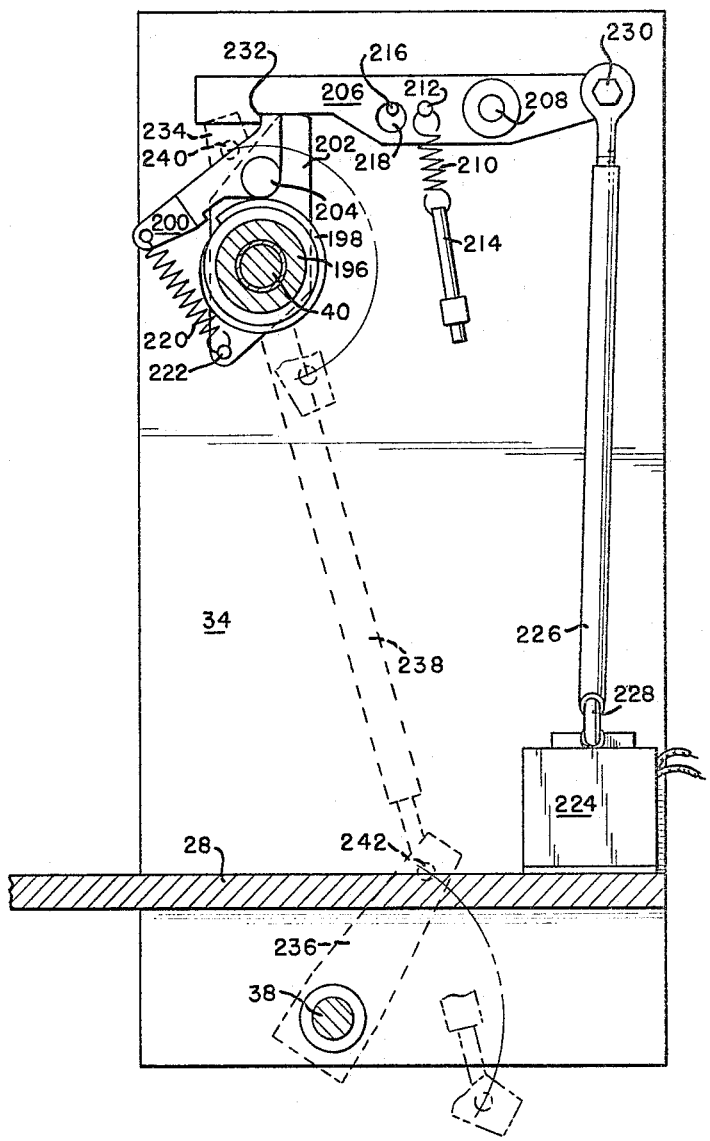
FIGURE 9 is an enlarged section view taken along line 9—9 of FIGURE 7, showing a means for providing a predetermined angular motion to the collar transfer mechanism at predetermined times.

Means for imparting motion to the moving parts of the machine are best shown in FIGURES 7, 8, and 9. Motor 174, mounted directly to frame plate 28, has an output shaft 176 on which pulley 178 is fixed and drives pulley 180 by means of belt 182. Shaft 184, on which driven pulley 180 is fixed, provides the drive input to a gear reduction system 186. The base plate of the gear reduction box 186 is mounted directly to the frame plate 28. Gears 188 and 190, fixed to the output shaft 192 of the gear reduction system, provide the drive for the collar transferring mechanism and the bottle transferring mechanism. Bevel gear 188 meshes with bevel gear 194, which has fixed thereto bushing 196. Ratchet 198 is fixed to the bushing 196 at the other end thereof, and the unit comprising gear 194, bushing 196, and ratchet 198 rotate freely about shaft 40. Ratchet 198 is adapted to be engaged by pawl 200, pivotally mounted on flange 202 at pin 204. Flange 202 is fixed to shaft 40, which is journalled in frame plates 32 and 34, and when the pawl and ratchet are engaged, the shaft 40 will be rotated. The pawl 200 is normally held in a disengaged position by lever 206, which pivots about pin 208. Lever 206 is urged to rotate to its counterclockwise-most position by spring 210, connected thereto at 212, and anchored to frame plate 34 by pin 214. Pin 216 extends from frame plate 34 and through opening 218 of lever 206, and limits the extreme positions thereof. When the pawl 200 is released by the lever 206, it is urged into engagement with the ratchet 198 by the force of spring 220, anchored at 222 to flange 202.

Intermittent rotation of shaft 40 of one revolution is accomplished generally in the following manner:

The ratchet 198 is driven constantly, rotating independent of and about shaft 40, by bevel gear 194. Shaft 40 is provided with a flange 202 fixed thereto and positioned adjacent ratchet 198, with pawl 200, at the same axial position of shaft 40 as ratchet 198, but positioned on flange 202 at a greater radial extent than ratchet 200. Shaft 40 is initially stationary. When switch 144 is closed by a bottle passing by wheel 130, solenoid 224 is energized and pulls through connecting rod 226, connected thereto at 228 and to lever 206 at 230, causing lever 206 to rotate about its pivot point 216, thereby releasing pawl 200 to drop down into the path of the already-rotating ratchet 198. The pawl 200 is picked up by ratchet 198, and turns therewith, thereby causing shaft 40 to rotate. Before the shaft 40 has completed a revolution, solenoid 224 is de-energized, allowing lever 206 to return to its counterclockwise-most position, and when the ratchet completes its revolution, the hook 232 of lever 206 catches the pawl and forces it to rotate about pivot point 204 out of engagement with the ratchet. Shaft 40 has fixed thereto crank 234, and shaft 38, which drives the collar transferring mechanism, has fixed thereto crank 236. Connecting rod 238 is pivotally attached to crank 234 at 240, and to crank 236 at 242. This linkage is designed such that for one revolution of the crank 234, an angular motion through a predetermined arc is imparted to crank 236 and hence to shaft 38. This arc of movement is such as to carry the bottle transfer mechanism through a complete cycle.

Shaft 40 also operates nest jogger 150, as hereinbefore explained, and vacuum line valve 244 (FIGURES 3 and 7). Valve 244 is attached to frame plate 32 and is placed in the vacuum line 126 running from the vacuum source (not shown) to the suction cup 124. Shaft 40 has fixed thereto cam 248 which operates valve control lever 252. Lever 252 is pivoted at 154 to frame plate 32 and is provided with cam follower 256. The other end of lever 252 operates valve 244 through valve control pin 258.

The valve 244 is usually opened to provide suction to suction cup 124 at the point in the cycle of the collar transferring mechanism when the suction cup 124 contacts the bottom collar in the nest. It has been found that this suction is best held during the collar transfer stroke to a point just prior to the end of the transfer stroke, where it is cut off. By having the suction cut off at this point, the collar is released while it still has momentum in an axial direction of the bottle M' to be collared. In this manner, it is insured that the collar will be snugly seated on the neck of bottle M'.

The mechanism for providing rotary motion to the bottle transferring wheels 50 and 52 is probably best shown in FIGURES 7 and 8. The means for providing intermittent motion to the wheels 52 and 54 is through a pawl and ratchet arrangement, similar to that just described for the collar transferring mechanism. Gear 190, fixed to the output shaft 192 of the gear reducing system 186, meshes with gear 260. A train of gears 260, 262, 264, and 266, provide a constant rotary movement to bushing 268, which carries ratchet 270. Gear 266, bushing 268, and ratchet 270 rotate as a unit independently of, and about shaft 36. Shaft 36 has fixed thereto flange 272, which carries a pawl 274 pivoted at 276 thereon. The ratchet 270 is adapted to be engaged by pawl 274, and when so engaged, will cause shaft 36 to be rotated. The pawl 274 is urged into engagement with ratchet 270 by spring 278, anchored to the flange 272 at 280. Spring 282 normally urges lever 284 to rotate about pivot point 286 and hold the pawl 274 out of engagement with the ratchet 270, against the action of spring 278.

Intermittent rotation of shaft 36 of one revolution is accomplished generally in the following manner:

The ratchet 270 is driven constantly, rotating independent of and about shaft 36. The flange 272 fixed to shaft 36 is positioned adjacent ratchet 270, with pawl 274 at the same axial position of shaft 36 as ratchet 270, but positioned on flange 272 at a greater radial extent than ratchet 270. Shaft 36 is initially stationary. When the micro switches 298 are closed by the action of backed up bottles bearing against feelers 128, solenoid 288 is energized, and pulls through connecting rod 292, connected thereto at 290 and to lever 284 at 294, causing lever 284 to rotate clockwise about its pivot point 286, thereby releasing pawl 274, to drop down into the path of the already-rotating ratchet 270. The pawl 274 is picked up by ratchet 270 and turns therewith, thereby causing shaft 36 to rotate. Normally before the shaft 36 has completed a revolution, solenoid 288 is de-energized, allowing lever 284 to return to tis counterclockwise-most position, and when the ratchet completes its revolution, the hook 296 of lever 284 catches the pawl 274, and forces it to rotate about pivot point 276 out of engagement with the ratchet. If, however, the backlog of bottles M is sufficiently large, the feelers 128 will remain depressed and the solenoid 288 will remain energized allowing the pawl 274 and ratchet 270 to remain engaged, continuing the rotation of shaft 36.

For an understanding of the operation sequence of the machine, particular attention should be given FIGURES 1, 2, 3, and 4, which illustrate the machine just after a backlog of bottles has been detected by feelers 128. In the stop position of the bottle transfer wheels 52 and 54, one pair of the outer rims 74 are in the path of bottles moving along conveyor 12. As the leading bottle M contacts the outer rim 74, it will be stopped, and as the conveyor 12 continues to advance from left to right, successive bottles M will back up against the leading bottle. The feelers 128 are connected to micro switches 298, connected in series, which serve to energize solenoid 288 when they both are closed, to operate the bottle transfer wheels 52 and 54.

Assume that the conveyor has just backed up 5 bottles upstream from the machine, and the pins 142 are set to collar every bottle. Both feelers 128 have closed micro switches 298, reseulting in solenoid 288 being energized. As hereinbefore explained, when solenoid 288 is energized, shaft 36 turns for a complete revolution. A bottle M is picked up in each of the slots 58 of the wheels 52 and 54, and is transferred to a bottle collaring station indicated by the position of bottle M' in FIGURES 1 and 3. As predetermined bottles are moved past the wheel 130, micro switch 146 is tripped, causing the collar transfer mechanism to move through a complete cycle. As the bottle M' moves into the collaring station, bottle stop lever 64 is moved by cam 60 into stop position. Note that at the collaring station, the bottle M' has been completely moved out of slots 58 by the movement of the conveyor, and the bottle M' is momentarily held stationary between the outer rim 74 and the stop member 72. At the moment the bottle is stopped in this position, the collar transfer mechanism has withdrawn a collar and inverted it. The collar transfer mechanism will continue to carry it in a direction generally parallel to the axis of the bottle, until the small end of the collar is well past the top of the bottle M'. The vacuum to suction cup 124 is then released just prior to the end of the collar transfer stroke, allowing the collar to be thrown down to be seated on the neck of the bottle. The point of vacuum release is approximately at the position shown in FIGURE 1. As soon as the collar is released, cam 60 allows the stop lever 64 to move to the release position, letting the bottle M' move out of the collaring station. The bottle in the next slot 56 by this time is ready to trip the wheel 130 to repeat the action. If the bottle feed into the machine is fast enough, the backlog of bottles will not be depleted, allowing the feelers to continue in the depressed position, resulting in continuous rotation of the bottle transfer wheels 52 and 54.

It will be understood that various changes in the details, materials, steps and arrangement of parts, which have been herein described and illustrated in order to explain the nature of the invention, may be made by those skilled in the art, within the principle and scope of the invention as expressed in the appended claims.

I claim:

1. The combination with a bottle conveyor having a bottle collaring station, of apparatus for applying tapered, tubular collars to the bottles at said bottle collaring station, said apparatus comprising
    (a) means for supporting a stack of collars at said bottle collaring station nested with their smaller ends closest to a bottle to be collared,
    (b) means for detecting a bottle ready to be collared at a predetermined point on the conveyor,
    (c) grasping means responsive to said detecting means for grasping the end collar in the nest,
    (d) means operably connected to said grasping means for moving it through a cycle of reciprocation having a collar transferring stroke and a return stroke, said means being pivotally mounted for movement in a vertical plane for moving said grasping means from collar grasping position to collar applying position, (e) means for turning said grasping means during its collar transferring stroke so that a collar held thereby assumes a large-end-down position, and
(f) means for releasing the collar from said grasping means over the neck of the bottle being collared,
(g) whereby the entire transferral of said collar between the nest and the bottle is effectuated by single collar grasping means.

2. The combination with a bottle conveyor having a bottle collaring station, of apparatus for applying tapered, tubular collars to the bottles at said bottle collaring station, said apparatus comprising
(a) means for supporting a stack of collars above said bottle collaring station nested with their smaller ends lowermost,
(b) means for detecting a bottle at a predetermined point on the conveyor approaching said bottle collaring station,
(c) grasping means responsive to said detecting means for grasping the lowermost collar in the nest,
(d) means operably connected to said grasping means for moving it through a cycle of reciprocation having a collar transferring stroke and a return stroke, said means being pivotally mounted for movement in a vertical plane for moving said grasping means from collar grasping position to collar applying position,
(e) means for turning said grasping means during its collar transferring stroke so that a collar held thereby assumes a large-end-down position, and
(f) means for releasing the collar from said grasping means over the neck of the bottle being collared,
(g) whereby the entire transferral of said collar between the nest and the bottle is effectuated by single collar grasping means.

References Cited by the Examiner
UNITED STATES PATENTS

| | | | |
|---|---|---|---|
| 1,962,481 | 6/1934 | Clark | 53—292 X |
| 1,971,576 | 8/1934 | Nelson | 29—208 |
| 3,096,575 | 7/1963 | Cook. | |

FRANK E. BAILEY, *Primary Examiner.*

TRAVIS S. McGEHEE, *Examiner.*

A. E. FOURNIER, L. S. BOUCHARD,
*Assistant Examiners.*